United States Patent Office 3,577,380
Patented May 4, 1971

3,577,380
CROSS-LINKED CARBOXYLATED ELASTOMERS
Charles R. Binder, Romeo, Mich., assignor to General
Motors Corporation, Detroit, Mich.
No Drawing. Filed June 28, 1968, Ser. No. 740,981
Int. Cl. C08g 41/00, 41/02
U.S. Cl. 260—41.5
5 Claims

ABSTRACT OF THE DISCLOSURE

The strength of uncured elastomeric polymers containing pendant carboxyl groups may be markedly improved by cross-linking such elastomers through the carboxyl groups with polymethylene polyphenylisocyanate. In a preferred embodiment, a filler material containing reactive hydroxyl groups is incorporated into the curable mixture for additional cross-linking and further improvement in physical strength.

---

This invention relates to the cross-linking of carboxylated elastomer molecules. More specifically, this invention relates to a cross-linked elastomer composition formed by the reaction of a carboxylated elastomer with a polyfunctional isocyanate compound.

It is known that certain physical properties of elastomeric polymeric compositions are improved if the individual polymeric molecules are interconnected by a procedure characterized as cross-linking or vulcanization. In the case of natural rubber and synthetic elastomers containing free double bonds in the polymer, molecule, cross-linking is accomplished by suitable processing with sulfur and known vulcanization reaction accelerators. More recently certain commercial elastomeric compositions such as polybutadiene, acrylonitrile-butadiene copolymer and styrene-butadiene copolymer have been modified to contain pendant carboxyl groups distributed randomly along the length of the polymer molecule chain. Even though there may also be double bonds within these particular polymer molecules available for cross-linking, it has been noted that somewhat different and desirable physical properties may be obtained by cross-linking through the carboxyl groups. Heretofore, this latter type of cross-linking has been accomplished by reaction of the carboxyl groups with a difunctional basic material such as zinc oxide. In general, stearic acid is incorporated with the polymer and base for processing purposes. Also an accelerator, such as tetramethylthiuramdisulfide is frequently employed. The mixture of cross-linking additives and carboxylated polymer are milled together and subsequently molded and cured into a useful cross-linked composition. Filler materials which are largely chemically inert with respect to the polymer and cross-linking agents are incorporated for purposes well recognized in the prior art.

It is an object of the present invention to provide a new cross-linked carboxylated elastomer formulation having properties generally superior to those prepared using zinc oxide or other inorganic bases and which formulation is more easily prepared.

It is a more specific object of the present invention to provide a cross-linked elastomeric polymer which is formed by the reaction between an uncured carboxylated elastomer and a polymethylene polyphenylisocyanate, the polyfunctional isocyanate compound providing the linking structure between the high molecular weight polymer chains.

It is a further object of the present invention to provide a cross-linked elastomeric composition formed by the reaction between an elastomeric polymer containing pendant carboxyl groups, polymethylene polyphenylisocyanate and a filler material containing reactive hydroxyl groups. This reaction product is characterized in that the polymer chains are tied together by the polyphenylisocyanate alone through reaction between isocyanate groups and the carboxyl groups, and the isocyanate compound and the filler material in combination by means of a further reaction between the isocyanate groups and the hydroxyl groups in the molecules of the filler material.

In a preferred embodiment these and other objects are accomplished by mixing together about 100 parts by weight of an uncured carboxylated elastomer, 6–12 parts by weight of a polymethylene polyphenylisocyanate and, when desired, a suitable amount of a filler containing reactive hydroxyl groups to obtain a relatively uniform mixture. Examples of suitable hydroxyl group containing fillers include talc, fly ash, silica and asbestos. The unreacted mixture is subjected to suitable elevated temperatures and pressures for a period sufficient to mold the composition to a strong, tough cross-linked elastomer.

There are a number of commercially available uncured carboxylated elastomers. In general, they are prepared by incorporating small amounts of a monomer containing carboxyl groups, such as for example, acrylic acid, with the monomeric materials which are to be polymerized to form the major portion of the elastomer. Thus, with a relatively small amount of acrylic acid incorporated with butadiene, acrylonitrile and butadiene, or styrene and butadiene, the resulting elastomer will contain randomly distributed pendant carboxyl groups on the giant polymer chain. For example, a particular commercially available carboxylated polybutadiene composition has a carboxyl content of 0.12 gram equivalents per 100 grams of polymer. This material has been employed as a binder for rocket fuels. Acrylonitrile-butadiene copolymer (38% acrylonitrile) has been produced having a carboxyl content of 0.075 equivalents per 100 grams of resin. This carboxylated elastomer has been employed in adhesive and coating applications. Certain physical properties of these carboxylated polymers such as modulus of elasticity, compression set, tear strength and oil resistance may be improved by cross-linking through the carboxyl groups with basic materials such as zinc oxide.

However, I have found that these properties may be further enhanced by a different type of cross-linking reaction wherein polymethylene polyphenylisocyanate is employed. This polyisocyanate has a generalized structure formula as follows:

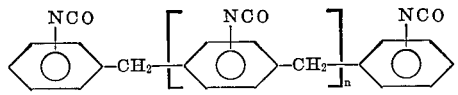

Polymethylene polyphenylisocyanate (PAPI) is a liquid and is approximately a trifunctional isocyanate. Thus, the average value of $n$ is close to one. The isocyanate equivalent is 133.5 and the —NCO content, by weight, is 31.5. PAPI has previously been used in rigid urethane foams and certain adhesive formulations. In accordance with my invention I propose that this polyphenylisocyanate material be employed to cross-link carboxylated uncured elastomers through reaction of the isocyanate groups with pendant carboxyl groups on elastomer molecules. I have found that polymethylene polyphenylisocyanate is uniquely useful in this composition because of its low melting point, its compatibility with the carboxylated polymers and its polyfunctionality. It is the only isocyanate that I consider to be useful in accordance with my invention.

It is known that isocyanate groups are reactive under suitable conditions with hydroxyl groups and carboxyl groups. Since PAPI is a polyfunctional isocyanate there may be reaction sites available for combination with hydroxyl groups present in the molecules of filler particles as well as for combination with the carboxyl groups attached to the polymer chain. In fact, I have found that additional cross-linking and resulting improvements in properties such as modulus of elasticity are obtainable by incorporating conventional fillers which contain hydroxyl groups into the carboxylated elastomer-polyphenyl-isocyanate formulation. Examples of suitable fillers include talc, asbestos, silica and fly ash.

Some specific examples will further illustrate the practice of my invention. As implied above, a qualitative evaluation of the existence and degree of cross-linking in an elastomer composition may be obtained by measuring certain physical properties such as modulus of elasticity and compression set. In the examples that will be described herein one or both of these physical properties of different compositions will be measured. The modulus of elasticity was determined in accordance with ASTM Procedure D412–641 whereby a dumbbell-shaped specimen is stretched to at least twice its original length and the tensile load at 100% elongation noted. Compression set data is obtained in accordance with ASTM Procedure D395–61 Method B wherein elastomeric plugs about 1" in diameter and ½" in thickness are loaded to obtain a constant deflection of 25% (i.e. to 75% of their original thickness) for 22 hours at 212° F. When the load is released the thickness of the plug is again measured and the percentage of compression set is noted. If the unloaded plug remains in the same configuration as when loaded the compression set is deemed 100%. If the unloaded plug returns to its original configuration the compression set is zero percent. In general, measured values lie between these extremes. Cross-linked materials tend to have low values of compression set as compared with uncross-linked materials.

Commercial carboxylated acrylonitrile-butadiene copolymer, containing about 38% acrylonitrile and 0.075 carboxyl equivalents per 100 grams of elastomer, was evaluated in accordance with the above procedures with respect to its modulus of elasticity at 100% elongation and compression set. The modulus of elasticity was found to be 105 p.s.i. and the compression set of this substantially uncross-linked copolymer was 100%.

One hundred parts by weight of uncured carboxylated butadiene-acrylonitrile elastomer of the above composition was banded on a roller mill at a temperature of about 140° F. To the elastomer was added nine parts of polymethylene polyphenyl-isocyanate until the mixture appeared to be uniform. The mixture was removed from the roller mill and molded into a slab of about 6" x 6" x 0.1" under about ten tons ram pressure at 320° F. for 20 minutes. Specimens were prepared from the molded slab in accordance with above-defined test procedures and the two physical properties determined. The modulus of elasticity at 100% elongation was found to be 425 p.s.i., a more than fourfold increase over that of the uncured rubber. The compression set of the PAPI cured elastomer was found to be 81%, a marked reduction from that of the uncured elastomer.

For purposes of comparison 100 parts of uncured carboxylated butadiene-acrylonitrile rubber was milled with 9.3 parts of zinc oxide and 1 part of stearic acid as has been done in the prior art. When a uniform mixture was obtained the material was removed from the mill and molded as described above at 320° F. for 20 minutes. Specimens of the material were subjected to compression set tests and tensile tests. The modulus of elasticity at 100% elongation was found to be 370 p.s.i. and the percentage of compression set was found to be 90.9%. The results of this experiment reflect a general pattern that I have found in that PAPI cured carboxylated elastomers are stronger and more resistant to compression set than the same elastomer cured with zinc oxide.

Additional experiments were performed generally following the above examples with the exception that filler materials such as fly ash, silica and asbestos were incorporated in the formulation with the uncured carboxylated acrylonitrile-butadiene copolymer and the cross-linking agent, whether PAPI or zinc oxide. The formulations in parts per weight and the physical properties determined by testing the cured formulations are tabulated below.

TABLE I

| Formulation No. | 1 | 2 | 3 | 4 | 5 | 6 | 7 | 8 |
|---|---|---|---|---|---|---|---|---|
| Components, parts by weight: | | | | | | | | |
| Carboxylated acrylonitrile-butadiene | 100 | 100 | 100 | 100 | 100 | 100 | 100 | 100 |
| PAPI | | 9.0 | | 9.0 | | 9.0 | | 9.0 |
| Zinc oxide | 9.3 | | 9.3 | | 9.3 | | 9.3 | |
| Stearic acid | 1.0 | | 1.0 | | 1.0 | | 1.0 | |
| Fly ash | 15.0 | 15.0 | | | | | 15.0 | |
| Silica | | | 15.0 | 15.0 | | | | |
| Asbestos | | | | | 15.0 | 15.0 | | |
| Talc | | | | | | | 15.0 | 15.0 |
| Physical properties: | | | | | | | | |
| Modulus at 100% (p.s.i.) | 359 | 440 | 566 | 795 | 670 | 650 | 610 | 635 |
| Compression set (percent) at 212° F. | 92 | 82.6 | 90 | 75 | 93.0 | 71.3 | 91.2 | 73.8 |

As would be expected the cross-linked materials, whether employing zinc oxide or PAPI as the curing agent, were found to be stronger than the uncross-linked polymer. Moreover, it is seen that the moduli of elasticity obtained with PAPI were with one exception greater than the moduli obtained employing zinc oxide and other accelerators and processing agents. The resistance to compression set of samples in which PAPI and filler materials containing hydroxyl groups were incorporated were invariably superior. It is particularly noted that the curing combination of PAPI and silica or PAPI and fly ash produced cross-linked elastomers that were markedly stronger than those produced employing zinc oxide. It is believed that this indicates that there is at least some cross-linking obtained between the elastomer, PAPI, and the filler material to provide additional stiffening of the polymer matrix.

A series of experiments similar to those conducted above were conducted employing uncured carboxylated polybutadiene. The uncured carboxylated polybutadiene was not moldable and was not subjected to modulus tests. PAPI cured and zinc oxide cured carboxylated polybutadiene elastomers were prepared from this elastomer and their moduli of elasticity determined. Finally PAPI cured and zinc oxide cured formulations containing the same filler materials as above were subjected to modulus tests and the formulation and modulus data at 100% elongation are tabulated below. Molding of the carboxylated polybutadiene based formulations was accomplished employing about ten tons ram pressure at 310° F. for thirty minutes.

TABLE II

| Formulation No. | 1 | 2 | 3 | 4 | 5 | 6 | 7 | 8 | 9 | 10 |
|---|---|---|---|---|---|---|---|---|---|---|
| Components, parts by weight: | | | | | | | | | | |
| Carboxylated polybutadiene | 100 | 100 | 100 | 100 | 100 | 100 | 100 | 100 | 100 | 100 |
| PAPI | 9.0 | | 9.0 | | 9.0 | | 9.0 | | 9.0 | |
| Zinc oxide | | 5.0 | | 5.0 | | 5.0 | | 5.0 | | 5.0 |
| Stearic acid | | 1.0 | | 1.0 | | 1.0 | | 1.0 | | 1.0 |
| Tetramethylthiuram-disulfide | | 3.5 | | 3.5 | | 3.5 | | 3.5 | | 3.5 |
| Fly ash | | | 10.0 | 10.0 | | | | | | |
| Silica | | | | | 10.0 | 10.0 | | | | |
| Asbestos | | | | | | | 10.0 | 10.0 | | |
| Talc | | | | | | | | | 10.0 | 10.0 |
| Physical properties: Modulus at 100% (p.s.i.) | 320 | 223 | 241.9 | 251.3 | 273 | 350 | 370 | 460 | 290 | 655 |

It is noted that in each instance the modulus of the PAPI cured material is superior to that of the conventionally cured material.

In general, I have found that polymethylene polyphenylisocyanate may be incorporated into uncured carboxylated elastomer compositions and reacted therewith to improve physical properties thereof in a number of different ways. PAPI may be incorporated as the sole cross-linking agent into uncured carboxylated polymer on a hot mill. While the addition of relatively small amounts of PAPI will produce some improvement in the strength and other properties of the polymer upon curing, I have found that it is generally preferable that about 6–12 parts per weight of PAPI per 100 parts of elastomer be employed. In general, more than 12 parts of the cross-linking material per 100 parts of elastomer produces little additional benefit when the additional cost is considered. Conventional curing agents such as zinc oxide and sulfur may advantageously be added to PAPI containing carboxylated elastomers. In this instance preferably PAPI is incorporated into the rubber on a hot mill. The mill is then cooled and thhe conventional compounding ingredients are added. By combining these different curing agents I have found that PAPI generally improves the properties of the cured elastomer over those obtainable when only conventional materials are employed. However, when PAPI is utilized in combination with conventional curing agents lesser amounts of the polyfunctional isocyanate may be employed. It has also been found that PAPI and hydroxyl group containing filler such as asbstos, talc, fly ash and silica may be incorporated together on a hot mill into the uncured polymer. The polymer is then preferably cooled and molded, or cooled and conventional curing agents added prior to molding. The amount of filler material which may be added in accordance with my invention is in general not critical, but is usually limited only by the conventional processing techniques and the properties of the polymer that is sought. Typically, up to about 60 parts of filler per 100 parts of elastomer may be employed. Overfilling, of course, tends to make the elastomer more brittle.

I have illustrated my invention in terms of cured elastomeric formulations formed by the reaction of carboxylated polybutadiene and PAPI, whether filled or unfilled, and carboxylated acrylonitrile-butadiene with PAPI, whether filled or unfilled. It will be appreciated that this polyphenyl isocyanate is capable of reacting with pendant carboxyl groups upon other polymer chains, such as carboxylated styrenebutadiene and the like, and therefore it is apparent that my invention comprehends the reaction product of PAPI with any uncured carboxylated elastomeric material. Accordingly, while my invention has been described in terms of a few specific embodiments it is apparent that other forms can readily be adapted by those skilled in the art and therefore my invention should be limited only by the scope of the following claims.

I claim:
1. A cross-linked elastomer comprising the reaction product of polymethylene polyphenylisocyanate with an elastomeric polymer selected from the group consisting of carboxylated polybutadiene, carboxylated styrene-butadiene copolymer and carboxylated acrylonitrile-butadiene copolymer and characterized by the presence of pendant carboxyl groups along its molecular chains, the cross-linking of said molecular chains of said elastomer resulting at least in part from the reaction of the isocyanate groups of polymethylene polyphenylisocyanate with said carboxyl groups.

2. A cross-linked elastomer comprising the reaction product of polymethylene polyphenylisocyanate, an elastomeric polymer selected from the group consisting of carboxylated polybutadiene, carboxylated styrene-butadiene copolymer and carboxylated acrylonitrile-butadiene copolymer and characterized by the presence of pendant carboxyl groups along its molecular chains and a filler containing a plurality of reactive hydroxyl groups, the cross-linking of the said molecular chains of said elastomer resulting at least in part from the reaction of a portion of the isocyanate groups of said polymethylene polyphenylisocyanate with said carboxyl groups and the reaction of another portion of said isocyanate groups with said hydroxyl groups.

3. A cross-linked acrylonitrile-butadiene copolymer comprising the reaction product of polymethylene polyphenylisocyanate, carboxylated acrylonitrile-butadiene copolymer characterized by the presence of pendant carboxyl groups along its molecular chains and a filler containing a plurality of reactive hydroxyl groups, the cross-linking of the molecular chains of said copolymer resulting at least in part from the reaction of a portion of the isocyanate groups of said polymethylene polyphenylisocyanate with said carboxyl groups and the reaction of another portion of said isocyanate groups with said hydroxyl groups.

4. A cross-linked polybutadiene composition comprising the reaction product of polymethylene polyphenylisocyanate, carboxylated polybutadiene characterized by the presence of pendant carboxyl groups along its molecular chains and a filler containing a plurality of reactive hydroxyl groups, the cross-linking of the molecular chains of said polybutadiene resulting at least in part from the reaction of a portion of the isocyanate groups of said polymethylene polyphenylisocyanate with said carboxyl groups and the reaction of another portion of said isocyanate groups with said hydroxyl groups.

5. A cross-linked elastomer comprising the reaction product of 100 parts by weight of an elastomeric polymer selected from the group consisting of carboxylated polybutadiene and carboxylated acrylonitrile-butadiene copolymer, 6–12 parts by weight of polymethylene polyphenylisocyanate; and a filler taken from the group consisting of fly ash, silica, asbestos and talc.

References Cited
UNITED STATES PATENTS 3,382,215   5/1968   Baum _____ 260—77.5CR
3,410,836   11/1968  Hsieh et al. ____ 260—77.5CR

OTHER REFERENCES

Modern Plastics Encyclopaedia 1967 (McGraw-Hill) (N.Y.) (September 1966), p. 589.

Condensed Chemical Dictionary (6th Ed.) (Reinhold) (N.Y.) (1961), pp. 1103–1104.

Dombrow-Polyurethanes (2nd Ed.) (Reinhold) (N.Y.) (1965), pp. 17–18.

MORRIS LIEBMAN, Primary Examiner

H. H. FLETCHER, Assistant Examiner

U.S. Cl. X.R.
260—37, 77.1, 78